(12) United States Patent
Nishihara

(10) Patent No.: US 8,767,253 B2
(45) Date of Patent: Jul. 1, 2014

(54) INFORMATION PROCESSING APPARATUS AND COMPUTER PROGRAM PRODUCT

(75) Inventor: Yoshito Nishihara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 401 days.

(21) Appl. No.: 13/090,656

(22) Filed: Apr. 20, 2011

(65) Prior Publication Data

US 2011/0267628 A1 Nov. 3, 2011

(30) Foreign Application Priority Data

Apr. 30, 2010 (JP) ................................. 2010-105391

(51) Int. Cl.
*G06F 15/00* (2006.01)

(52) U.S. Cl.
USPC ........... 358/1.6; 358/1.13; 358/500; 358/1.15

(58) Field of Classification Search
None
See application file for complete search history.

(56) References Cited

U.S. PATENT DOCUMENTS

| 7,821,667 | B2 * | 10/2010 | Bahl et al. | 358/1.18 |
| 7,907,313 | B2 * | 3/2011 | Kurihara | 358/500 |
| 8,094,332 | B2 * | 1/2012 | Nakamura | 358/1.15 |
| 8,144,346 | B2 * | 3/2012 | Sakikawa | 358/1.13 |

FOREIGN PATENT DOCUMENTS

| JP | 2005-208916 A | 8/2005 |
| JP | 2006-65839 | 3/2006 |
| JP | 2007-249854 | 9/2007 |
| JP | 2007-249857 A | 9/2007 |
| JP | 2007-323234 | 12/2007 |
| JP | 2009-64415 | 3/2009 |

OTHER PUBLICATIONS

Office Action issued Jan. 21, 2014 in Japanese Patent Application No. 2010-105391.

* cited by examiner

*Primary Examiner* — Ashish K Thomas
(74) *Attorney, Agent, or Firm* — Oblon, Spivak, McClelland, Maier & Neustadt, L.L.P.

(57) ABSTRACT

An information processing apparatus includes a script file storage unit and a script execution unit. The script file storage unit stores therein a first script to convert the data format of print setting information from a first format to a second format, and a second script for converting the data format of the print setting information from the second format to the first format. At least part of the print setting information in the first format cannot be changed through an application. The print setting information in the second format can be changed through the application. The script execution unit executes at least one of the first script and the second script in accordance with a request from the application.

18 Claims, 17 Drawing Sheets

FIG.2

```
<item name="layout" type="pickone">
  <constraint fixvalue="off"
    <condition expression="booklet == on"/>
  </constraint>
  <pickone name="off"/>
  <pickone name="2in1"/>
  <pickone name="4in1"/>
</item>
```
} INFORMATION ABOUT SETTING OF NUMBER OF PAGES PER SHEET

```
<item name="booklet" type="pickone">
  <pickone name="off"/>
  <pickone name="on"/>
</item>
```
} INFORMATION ABOUT SETTING OF CENTER STITCHING

```
<item name="copies" type="number">
  <range min="1" max="999">
</item>
```
} INFORMATION ABOUT SETTING OF NUMBER OF COPIES

```
<item name="userid" type="string">
  <string min="1" max="8" chartype="alphanumeric">
</item>
```
} INFORMATION ABOUT SETTING OF USER ID

```
<item name="papersize" type="pickone">
  <pickone name="a3"/>
  <pickone name="a4"/>
</item>
```
} INFORMATION ABOUT SETTING OF PAPER SIZE

FIG.3

```
<psf:PrintTicket
        xmlns:psf="http://···/printschemaframework"
        xmlns:xsd="http://···/XMLSchema"
        xmlns:xsi="http://···/XMLSchema-instance"
        xmlns:rpsk="http://www.***.co.jp"
        xmlns:psk="http://···/printschemakeywords" version="1">
    <psf:ParameterInit name="psk:JobCopiesAllDocuments">
            <psf:Value xsi:type="xsd:integer">1</psf:Value>
    </psf:ParameterInit>
    <psf:Feature name="psk:JobNUpAllDocumentsContiguously">
            <psf:Option>
                    <psf:ScoredProperty name="psk:PagePerSheet">
                            <psf:Value xsi:type="xsd:integer">1</psf:Value>
                    </psf:ScoredProperty>
            </psf:Option>
    </psf:Feature>
    <psf:Feature name="psk:JobStapleAllDocuments">
            <psf:Option name="psk:None"/>
    </psf:Feature>
</psf:PrintTicket>
```

FIG.4

| INTERFACE NAME | EXPLANATION |
| --- | --- |
| DevmodeToPrintTicket | CONVERT INPUT DEVMODE TO XML PRINT SETTING INFORMATION TO RETURN |
| PrintTicketToDevmode | CONVERT INPUT XML PRINT SETTING INFORMATION TO DEVMODE TO RETURN |
| ValidatePrintTicket | MODIFY INPUT XML PRINT SETTING INFORMATION TO RETURN |
| GetPrintCapabilities | RETURN SPECIFICATIONS OF PRINTER |

FIG.5A

```
function DvemodeToPrintTicket( xmlmodule, settingmodule )

local settinglist = settingmodule.get_settings()

--OMITTED

--SETTING OF COPIES
if( settinglist.copies ~=nil ) then
    xmlmodule.set_element('/psf:PrintTicket[last()]',
                          'psf:Parameterlist' )

xmlmodule.set_attribute( '/psf:PrintTicket[last()]/psf:Parameterlist[last()]',
                             'name',
                             'psk:JobCopiesAllDocuments' )

xmlmodule.set_element( '/psf:PrintTicket[last()]//psf:Parameterlist[@name='psk:JobCopiesAllDocuments']',
                           'psf:Value' )

xmlmodule.set_attribute( '/psf:PrintTicket[last()]//psf:Parameterlist[@name='psk:JobCopiesAllDocuments']/psf:Value[last()]',
                             'xsi:type',
                             'xsd:integer' )

xmlmodule.set_text('/psf:PrintTicket[last()]//psf:Parameterlist[@name='psk:JobCopiesAllDocuments']/psf:Value[@xsi:type='xsd:integer']',
                       settinglist.copies)

end
```

FIG.5B

```
--SETTING OF STAPLE
if( settinglist.staple ~=nil ) then staple_tbl = {
    off = 'psk:None',
    on  = 'psk:On'
  } xmlmodule.set_element('/psf:PrintTicket[last()]',
                        'psf:Feature' )
  xmlmodule.set_attribute( '/psf:PrintTicket[last()]/psf:Feature[last()]',
                           'name',
                           'psk:JobCopiesAllDocuments' )

mlmodule.set_element( '/psf:PrintTicket[last()]/psf:Feature[@name='psk:JobStapleAllDocuments']',
                        'psf:Option' )
  xmlmodule.set_attribute( '/psf:PrintTicket[last()]/psf:Feature[@name='psk:JobCopiesAllDocuments']/psf:Option[last()]',
                           'name',
                           staple_tbl[settinglist.staple] )

end
--OMITTED
end
```

FIG.6

```
function PrintTicketToDevmode( xmlmodule, settingmodule )

--OMITTED local copies = xmlmodule.get_text ('/psf:PrintTicket[last()]//psf:ParameterInit[@name='psk:JobCopiesAllDocuments']/
psf:Value[@xsi:type='xsd:integer']')
    if ( copies ~=nil ) then
        settingmodule.set_value('copies',copies)
    end local staple = xmlmodule.get_attribute ('/psf:PrintTicket[last()]//psf:Feature[@name='psk:JobCopiesAllDocuments']/psf:Option[last()]',
                                              'name'
    if ( staple ~=nil ) then
        staple_tbl = {
            psk:None = 'off'
            psk:On   = 'on'
        }
        settingmodule.set_value('staple',staple_tbl[staple])
    end

--OMITTED end
```

FIG.7

```
require('DevmodeToPrintTicket')
require('PrintTicketToDevmode')

function ValidatePrintTicket( xmlmodule, settingmodule )

PrintTicketToDevmode( xmlmodule, settingmodule )
    xmlmodule.clear()
    DevmodeToPrintTicket( xmlmodule, settingmodule )

end
```

INFORMATION PROCESSING APPARATUS AND COMPUTER PROGRAM PRODUCT

CROSS-REFERENCE TO RELATED APPLICATIONS

The present application claims priority to and incorporates by reference the entire contents of Japanese Patent Application No. 2010-105391 filed in Japan on Apr. 30, 2010.

BACKGROUND OF THE INVENTION

1. Field of the Invention

The present invention relates to an information processing apparatus and a computer program product.

2. Description of the Related Art

A printer driver for Windows (registered trademark) has a system of PrintTicket. The PrintTicket is a system that enables an application to directly change a function unique to a vendor.

Conventionally, information (hereinafter, referred to as print setting information) used to control a printer has been exchanged between an application and a printer driver with a structure called DEVMODE. The print setting information includes information indicating how to print (the number of copies, the number of pages per sheet, presence of staple, and the like). For example, when the number of copies is set to be two, the number of copies that is two is input to the print setting information so as to execute printing.

DEVMODE is divided into a public area and a private area. Basic functions that are common among vendors are previously defined in the public area and definitions of the functions have been publicized. Since information of the public area has been publicized as described, settings in the public area can be changed by an application. Representative functions included in the public area are the number of copies, printing direction, and the like.

On the other hand, the private area is an area that can be originally defined by a vendor and functions unique to the vendor are defined in the private area. In general, information of the private area is not publicized. Therefore, an application cannot directly change the settings of the functions in the private area (functions unique to the vendor). As a method of changing the settings of the functions unique to the vendor, which are defined in the private area, a method in which a user changes the settings on a print setting screen provided by a printer driver is generally employed.

Accordingly, when the DEVMODE is used as print setting information, it is difficult to change a function unique to a vendor to a specific set value to execute printing without operation on a print setting screen by a user. For example, since the number of copies is a function defined in the public area of the DEVMODE, an application that causes to perform "always printing two copies of specified documents" can be realized. On the other hand, it is difficult to realize an application that causes to perform "forcibly changing a setting of a specific function defined in the private area to execute printing".

The settings in the private area of the DEVMODE can be operated through an application by using PrintTicket as print setting information. The PrintTicket is print setting information in an XML format. With the PrintTicket, the settings of functions unique to the vendor, which are hidden in the private area in a case of a DEVMODE format, is publicized to the application. The application operates print setting with the print setting information in the XML format (XML print setting information) to make the printer driver convert the set print setting information to DEVMODE. With this, the private area of the DEVMODE can be operated.

For example, when a staple function is forcibly made to be in an ON state by the application, the application generates PrintTicket (XML print setting information) including information indicating that the staple function is in the ON state and requests the driver to convert the generated PrintTicket to DEVMODE. The printer driver decodes information of the PrintTicket, changes the setting of the staple defined in the private area of the DEVMODE to be in the ON state, and returns the DEVMODE to the application. The application executes printing by using the DEVMODE, so that printing can be performed while setting the staple function to be in the ON state.

In Japanese Patent Application Laid-open No. 2009-064415, the following technique is proposed: A printer driver is made to store information (PrintCapabilities) indicating performance of a device to be controlled; When receiving a instruction to use a specified PrintTicket for controlling the device, the printer driver reflects contents of the PrintTicket onto setting contents used to control the device. With this technique, contents of setting performed by using a specific device driver can be easily and appropriately utilized even when another device driver is used.

When a new function emerges and is added to a printer with a plug-in or the like or when a set value of a function is added or modified, a function name or a set value in the PrintTicket is also needed to be added or modified. That is to say, the function name and the set value that are defined in the Print-Ticket are susceptible to addition or change of the function of the printer.

However, since a module that controls PrintTicket is generally in a binary format, there arises is a problem that, when a function name and a set value that are defined in the Print-Ticket are modified, the module has to be recompiled.

SUMMARY OF THE INVENTION

It is an object of the present invention to at least partially solve the problems in the conventional technology.

According to an aspect of the present invention, there is provided an information processing apparatus including: a storage unit and a script execution unit. The storage unit stores therein a first script to convert a data format of print setting information from a first format to a second format, and a second script to convert the data format of the print setting information from the second format to the first format. At least part of the print setting information in the first format cannot be changed through an application. The print setting information in the second format can be changed through the application. The script execution unit executes at least one of the first script and the second script in accordance with a request from the application.

According to another aspect of the present invention, there is provided a computer program product comprising a non-transitory computer-usable medium having computer-readable program codes embodied in the medium. The program codes includes codes configured as: a first script to convert a data format of print setting information from a first format to a second format; and a second script to convert the data format of the print setting information from the second format to the first format. At least part of the print setting information in the first format cannot be changed through an application. The print setting information in the second format can be changed through the application. The program codes when executed causing a computer to function as: a script execution unit that executes at least one of the first script and the second script in accordance with a request from the application.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a view illustrating an example of print setting information that is managed by a setting management unit;

FIG. 3 is a view illustrating an example of a data configuration of XML print setting information;

FIG. 4 is a table illustrating an example of operation interfaces of the XML print setting information;

FIGS. 5A and 5B illustrate an example of a script describing DevmodeToPrintTicket;

FIG. 6 is a view illustrating an example of a script describing PrintTicketToDevmode;

FIG. 7 is a view illustrating an example of a script describing ValidatePrintTicket;

FIG. 15 is a view illustrating an example of a method of managing scripts when a function is added with a plug-in;

DETAILED DESCRIPTION OF THE PREFERRED EMBODIMENTS

Hereinafter, an information processing apparatus and a computer program product according to an embodiment of the present invention are described in detail with reference to the accompanying drawings.

First Embodiment

Figure 1:
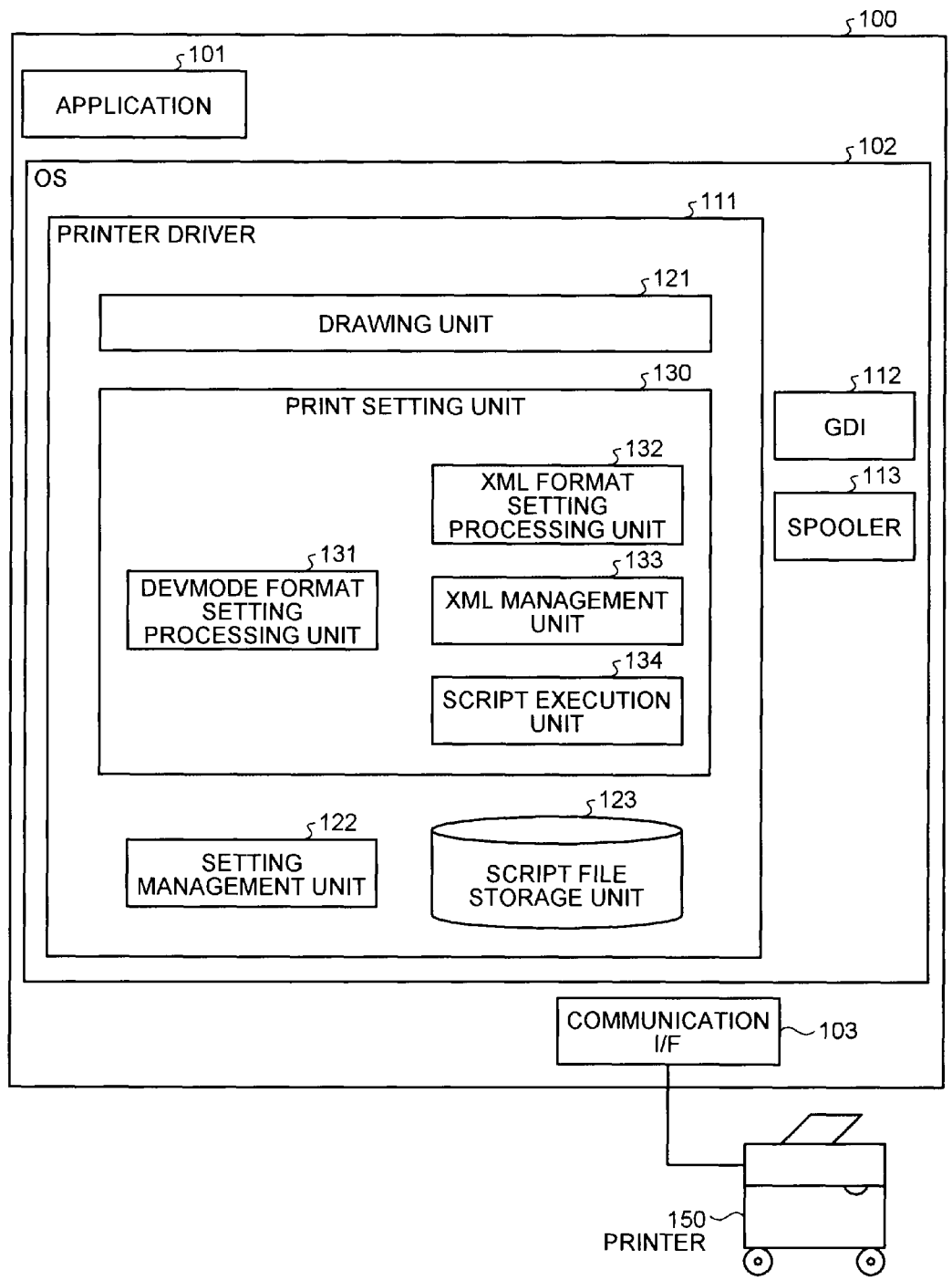
FIG. 1 is a block diagram illustrating an example of a configuration of an information processing apparatus according to a first embodiment of the present invention.

FIG. 1 is a block diagram illustrating an example of a configuration of an information processing apparatus according to a first embodiment of the present invention. As illustrated in FIG. 1, an information processing apparatus 100 includes an application 101, an OS (operating system) 102, and a communication I/F 103. The communication I/F 103 is connected to a printer 150 via a network. Therefore, a print request can be issued to the printer 150 from the information processing apparatus 100.

The printer 150 performs print processing in accordance with a print request input on an operation unit (not illustrated) included in the printer 150. Furthermore, the printer 150 includes an interface that is connected to the information processing apparatus 100. The printer 150 performs print processing in accordance with a print request from the information processing apparatus 100 that is connected to the printer 150 via the network. A multifunctional peripheral having at least two functions of a copying function, a printer function, a scanner function, and a facsimile function may be employed as the printer 150 according to the embodiment. It is to be noted that the printer 150 is not limited to the multifunctional peripheral and may be a printer that simply performs print processing.

Particularly in a multifunctional peripheral in recent years, a function tends to be easily added or deleted in accordance with a request from a user. For example, when a user wants to add a staple function, it is sufficient that the user contacts a maintenance section of the printer. Then, the maintenance section installs a computer program and the like for adding a function (for example, staple function) to the printer so that the user can use the function. When a function (for example, staple function) is added in such a manner, a printer driver that supports the function is needed in order to use the function from the information processing apparatus.

However, the printer driver is provided in a binary format. Therefore, in order to make the printer driver that supports the function added to the printer, it is necessary that a computer program thereof be rewritten and a printer driver that has been recompiled be installed. In the embodiment, a technique for reducing such an operational burden is proposed.

The application 101 in the information processing apparatus 100 is software that operates on the OS 102, which will be described later, and issues a print request to the OS 102.

The OS 102 includes a printer driver 111, a Graphics Device Interface (GDI) 112, and a spooler 113 and entirely controls the information processing apparatus 100.

The GDI 112 is one of subsystems included in the OS 102 and performs drawing processing. The GDI 112 calls the printer driver 111 and requests the printer driver 111 to perform print processing when the OS 102 receives a print request from the application 101, or the like.

The spooler 113 is also one of subsystems included in the OS 102 and is a module that temporarily accumulates print jobs to be transmitted to the printer 150.

The printer driver 111 includes a drawing unit 121, a print setting unit 130, a setting management unit 122, and a script file storage unit 123, and performs processing of issuing a print request to the printer 150.

The drawing unit 121 generates a command used to control a job of the printer 150, regarding the number of copies, staple, etc., and outputs the command to the printer 150. Furthermore, the drawing unit 121 generates a command for drawing contents of a print material on the printer 150 and outputs the command to the printer 150.

The setting management unit 122 manages print setting information. For example, the setting management unit 122 holds print setting information that is currently set, a default value of a set value of the print setting information, and set values that can be set (print performance). The print setting information is managed based on a function name and a set value that are specific in the setting management unit 122.

FIG. 2 is a view illustrating an example of print setting information that is managed by the setting management unit 122. FIG. 2 illustrates an example in which the setting management unit 122 manages print setting information in an XML format that is original in the setting management unit 122 (hereinafter, referred to as original XML format). For example, the number of copies is managed with a function name of "copies". It is to be noted that this function name is different from a function name "psk: JobCopiesAllDocuments" corresponding to the number of copies in the print setting information in a PrintTicket XML format (XML print setting information).

A management method is not limited to the method described above. For example, the setting management unit 122 may manage the print setting information with a function name and a set value that are the same as in the PrintTicket XML format (XML print setting information) or a DEVMODE format.

FIG. 3 is a view illustrating an example of a data configuration of the XML print setting information. FIG. 3 illustrates an example in which pieces of information such as "the number of copies (psk: JobCopiesAllDocuments)", "the number of pages per sheet (psk: JobNUpAllDocumentsContiguously)", "staple (psk: JobStapleAllDocuments)", etc. are described as the XML print setting information. It is to be noted that a description format of each function is previously defined.

Returning to FIG. 1, the setting management unit 122 further includes a function as a prohibiting engine that modifies inappropriate print setting information. For example, when a set value that is not allowed to be set is specified, the setting management unit 122 modifies this inappropriate print setting information by setting a default value, neglecting a specified set value without changing to the specified set value, and so on.

The script file storage unit 123 stores therein a text file (script file) in which a script that can be executed by a script execution unit 134, which will be described later, is described. The script file is a script described by a text and is used to generate a command to be executed by the printer 150. In the embodiment, although a Lua format is employed as a format of the script file, various formats may be employed as the format of the script file regardless of whether well-known or not.

Any methods may be used as a method of utilizing the script file. For example, a method in which the script file is deployed as a text file on the OS 102 or a method in which a plurality of text files are compressed in one archive file and the text files are uncompressed on a memory (not illustrated) or a file system at the time of execution so as to be utilized may be applied. It is to be noted that a specific example of the script file is described later.

The print setting unit 130 receives a change request of print setting information to change the print setting information in accordance with the change request and returns the changed print setting information to a request source. The print setting unit 130 includes a DEVMODE format setting processing unit 131, an XML format setting processing unit 132, an XML management unit 133, and the script execution unit 134.

The DEVMODE format setting processing unit 131 converts received print setting information in the DEVMODE format to print setting information in the original XML format so as to input the converted print setting information to the setting management unit 122. Furthermore, the DEV-MODE format setting processing unit 131 converts print setting information in the original XML format that has been acquired from the setting management unit 122 to print setting information in the DEVMODE format so as to transmit the converted print setting information to the OS 102. It is to be noted that there is a case in which the application 101 acquires the print setting information in the DEVMODE format through the OS 102 in a case when the request source is the application 101, or the like.

The XML format setting processing unit 132 converts received print setting information in the PrintTicket XML format (XML print setting information) to print setting information in the original XML format by script processing so as to input the converted print setting information to the setting management unit 122. Furthermore, the XML format setting processing unit 132 converts print setting information in the original XML format that has been acquired from the setting management unit 122 to print setting information in the XML format (XML print setting information) by script processing so as to transmit the converted print setting information to the OS 102. It is to be noted that there is a case in which the application 101 acquires the print setting information in the XML format through the OS 102 in a case when the request source is the application 101, or the like.

The XML management unit 133 manages print setting information in the PrintTicket XML format (XML print setting information). For example, the XML management unit 133 executes setting of a value for a specified Path and acquisition of a value from a specified Path.

The script execution unit 134 executes a script specified by the XML format setting processing unit 132 in accordance with a request from the application 101 or the like.

Next, the script (script file) is described in detail. As described above, the script is used when the XML format setting processing unit 132 operates XML print setting information.

FIG. 4 is a table illustrating an example of operation interfaces of the XML print setting information. With the operation interfaces, a PrintTicket function that enables the application to directly change a function unique to a vendor is realized. In the embodiment, the operation interfaces are described on the script file.

As illustrated in FIG. 4, four operation interfaces are used in the embodiment.

DevmodeToPrintTicket is an interface that converts input print setting information in the DEVMODE format to print setting information in the PrintTicket XML format (XML print setting information) so as to return the converted print setting information. A script describing the DevmodeToPrintTicket corresponds to a script (first script) to convert a data format of the print setting information from the DEVMODE format (first format), which includes print setting information (information in a private area) that cannot be changed by the application 101, to the XML print setting information (second format), which can be changed by the application 101.

The PrintTicketToDevmode is an interface that converts input XML print setting information to print setting information in the DEVMODE format so as to return the converted print setting information. The script describing the PrintTicketToDevmode corresponds to a script (second script) to convert a data format of the print setting information from the XML print setting information (second format) to the DEVMODE format (first format).

ValidatePrintTicket is an interface that verifies validity of input XML print setting information, and when an inappropriate set value has been input, modifies the inappropriate set value so as to return the modified print setting information. A script describing the ValidatePrintTicket corresponds to a script (fifth script) to verify whether the XML print setting information (second format) can be set, and modify the XML print setting information that cannot be set to XML print setting information that can be set.

GetPrintCapabilities is an interface that returns specifications of the printer 150, that is, information about set values that can be set as print setting information of the printer 150. A script describing the GetPrintCapabilities corresponds to a script (sixth script) to acquire set values that can be set for XML print setting information.

Next, specific examples of the script files are described with reference to FIGS. 5A, 5B, 6, and 7. FIGS. 5A and 5B illustrate an example of the script describing the DevmodeToPrintTicket. FIG. 6 is a view illustrating an example of the script describing the PrintTicketToDevmode. FIG. 7 is a view illustrating an example of the script describing the ValidatePrintTicket.

The DevmodeToPrintTicket in FIGS. 5A and 5B acquires a list of print setting information in the original XML format from the setting management unit 122 to set values for specific functions onto the XML management unit 133 in accordance with specification.

An xmlmodule corresponds to XML print setting information that is managed by the XML management unit 133, and a settingmodule corresponds to print setting information in the original XML format that is managed by the setting management unit 122.

"get_settings" expresses a function of acquiring the list of the print setting information. "set_element" and "set_attribute" express functions of setting XML element and attribute, respectively. These functions make it possible to execute setting of a value for a specified path.

It is to be noted that when function names or set values are different between the original XML format and the XML print setting information, the function name or the set value in the original XML format is required to be converted to the function name or the set value in the XML print setting information. In FIGS. 5A and 5B, an example in which a set value of Staple is converted is illustrated. That is to say, "off" or "on" that is a set value in the original XML format is converted to "psk:None" or "psk:On" that is a set value in the XML print setting information in the example illustrated in FIGS. 5A and 5B.

The PrintTicketToDevmode in FIG. 6 acquires a value on a specific Path from the XML management unit 133 to set the acquired set value onto the setting management unit 122.

"get_text" expresses a function of acquiring a set value that is currently set. "set_value" expresses a function of setting a set value. "get_attribute" expresses a function of acquiring a function name (attribute) that is currently set.

As in FIGS. 5A and 5B, when function names or set values are different between the original XML format and the XML print setting information, the function name or the set value in the original XML format is required to be converted to the function name or the set value in the XML print setting information. In FIG. 6, an example in which a set value of Staple is converted is illustrated.

The ValidatePrintTicket in FIG. 7 verifies validity of XML print setting information managed by the XML management unit 133. To be more specific, the ValidatePrintTicket acquires a value on a specific Path from the XML management unit 133, sets the acquired set value onto the setting management unit 122, acquires a list of print setting information in the original XML format from the setting management unit 122 and sets a set value of the acquired specific function onto the XML management unit 133 in accordance with specification. As described above, the setting management unit 122 functions as the prohibiting engine. That is to say, when the specific set value is set onto the setting management unit 122, if the specific set value is inappropriate, the setting management unit 122 modifies the specific set value to an appropriate set value. Therefore, the modified appropriate XML print setting information can be obtained by acquiring print setting information from the setting management unit 122 again.

It is to be noted that this flow of the processing is equivalent to a combination of a flow of the PrintTicketToDevmode and a flow of the DevmodeToPrintTicket. That is to say, the ValidatePrintTicket can be realized by sequentially calling the functions.

A GetPrintCapabilities includes a flow of acquiring information from the setting management unit 122 to convert the information to XML that is the same as a flow in the DevmodeToPrintTicket. That is to say, the GetPrintCapabilities is different from the DevmodeToPrintTicket only in a point that all of set values and the like that can be set are acquired in place of acquiring a set value and the like that are currently set. Accordingly, detail description of the GetPrintCapabilities is omitted.

Figure 8:
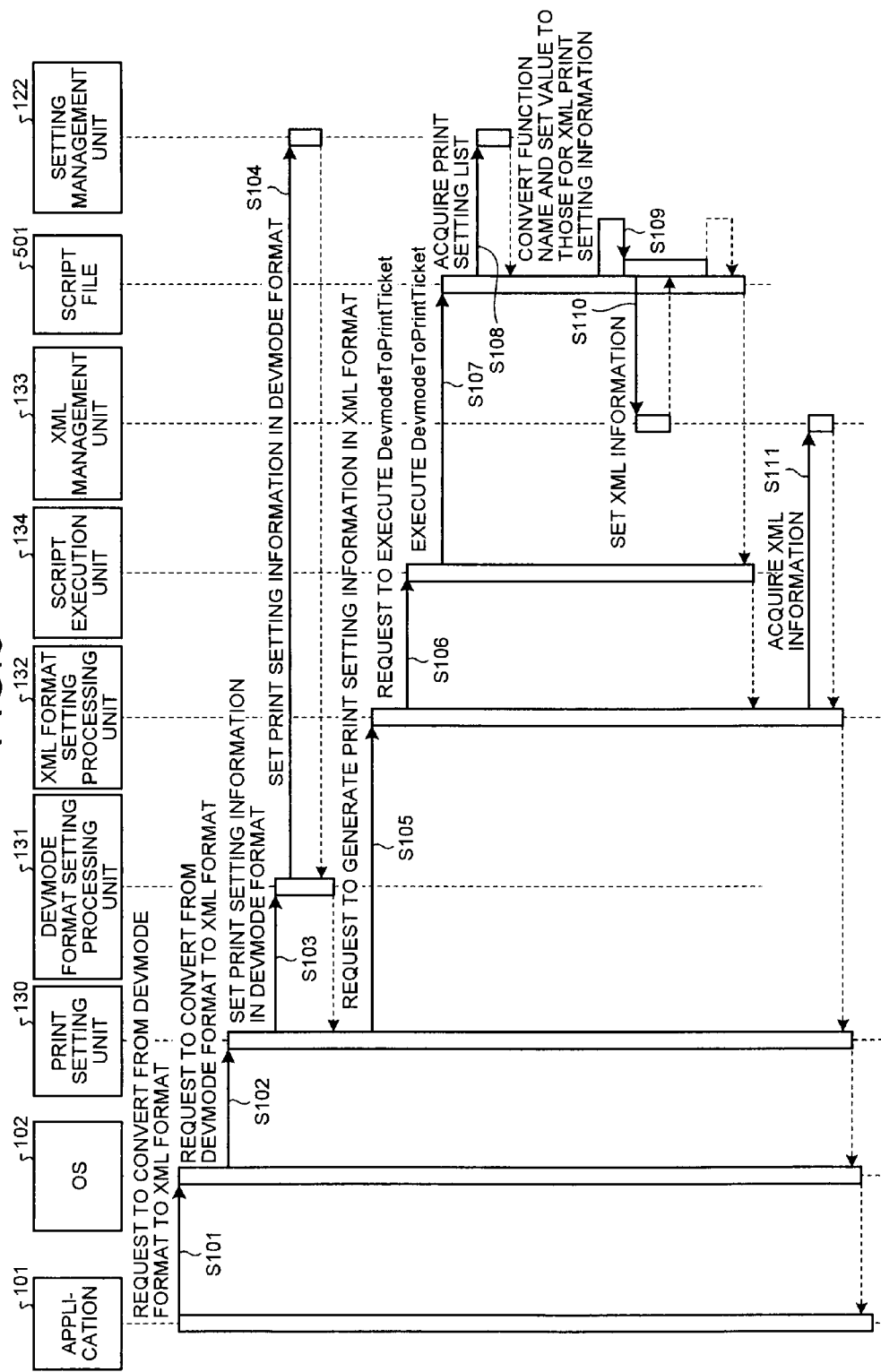
FIG. 8 is a sequence diagram illustrating an example of processing of converting print setting information in a DEVMODE format to print setting information in a PrintTicket XML format.

Next, sequences of respective processing by which respective scripts are executed are described with reference to FIGS. 8 to 11. FIG. 8 is a sequence diagram illustrating an example of processing of converting print setting information in the DEVMODE format to print setting information in the PrintTicket XML format. In this processing, the script of the DevmodeToPrintTicket (FIGS. 5A and 5B) is executed.

At first, the application 101 requests the OS 102 to convert print setting information in the DEVMODE format to print setting information in the PrintTicket XML format (step S101). The OS 102 requests the print setting unit 130 to convert from the DEVMODE format to the PrintTicket XML format (step S102).

The print setting unit 130 requests the DEVMODE format setting processing unit 131 to set the print setting information in the DEVMODE format (step S103). The DEVMODE format setting processing unit 131 sets the print setting information in the DEVMODE format to the setting management unit 122 (step S104). It is to be noted that when processing has been normally completed, for example, information indicating that the processing has been normally completed is returned to a request source. In the sequence diagrams illustrated in FIGS. 8 to 11, dashed arrows indicate that processing results are returned to request sources as descried.

Next, the print setting unit 130 requests the XML format setting processing unit 132 to generate print setting information in the XML format (XML print setting information) (step S105). The XML format setting processing unit 132 requests the script execution unit 134 to execute the script (FIGS. 5A and 5B) of the DevmodeToPrintTicket (step S106).

The script execution unit 134 executes the script of the DevmodeToPrintTicket (step S107). In the script, processing of acquiring a list of the print setting information that is currently set in the setting management unit 122 (step S108), processing of converting a function name or a set value to that for the XML print setting information (step S109), processing of setting the set value onto the XML management unit 133 (step S110), and the like are executed in accordance with description in a script file 501. It is to be noted that the script file 501 corresponds to a file in which the script of the DevmodeToPrintTicket as illustrated in FIGS. 5A and 5B is described.

Next, the XML format setting processing unit 132 acquires the XML print setting information from the XML management unit 133 (step S111). Thereafter, the acquired XML print setting information is returned to the application 101 through the OS 102, for example.

Figure 9:
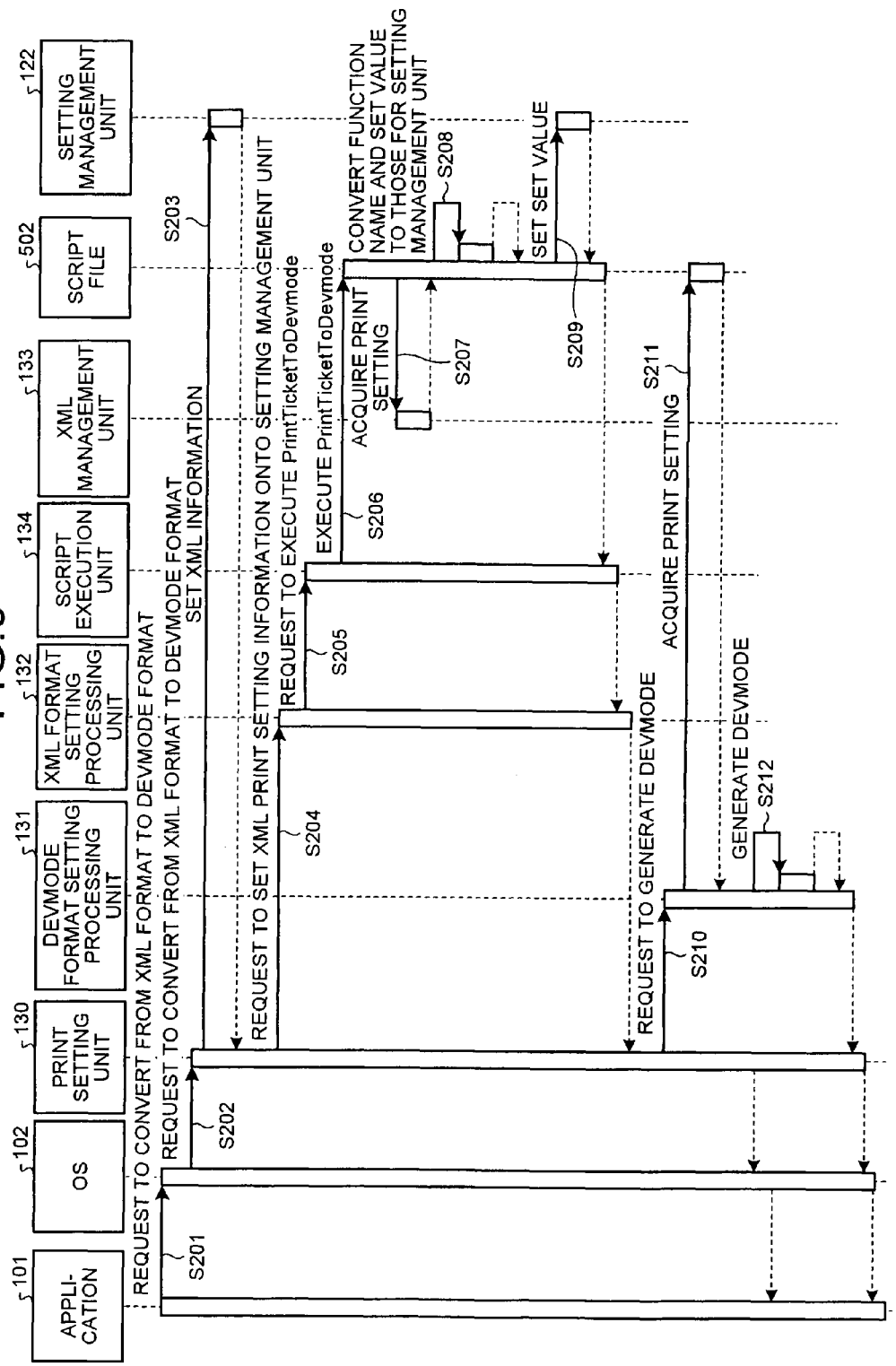
FIG. 9 is a sequence diagram illustrating an example of processing of converting print setting information in the PrintTicket XML format to print setting information in the DEVMODE format.

FIG. 9 is a sequence diagram illustrating an example of processing of converting print setting information in the PrintTicket XML format to print setting information in the DEVMODE format. In this processing, a script (FIG. 6) of the PrintTicketToDevmode is executed.

At first, the application 101 requests the OS 102 to convert print setting information from the PrintTicket XML format to the DEVMODE format (step S201). The OS 102 requests the print setting unit 130 to convert from the PrintTicket XML format to the DEVMODE format (step S202).

The print setting unit 130 sets set values of the XML print setting information that has been requested to be converted onto the setting management unit 122 (step S203). Next, the print setting unit 130 requests the XML format setting processing unit 132 to set the XML print setting information onto the setting management unit 122 (step S204). The XML format setting processing unit 132 requests the script execution unit 134 to execute the script (FIG. 6) of the PrintTicketToDevmode (step S205).

The script execution unit 134 executes the script of the PrintTicketToDevmode (step S206). In the script, processing of acquiring print setting information set onto the XML management unit 133 (step S207), processing of converting a function name or a set value to that for the setting management unit 122 (original XML format) (step S208), processing of setting the set value onto the setting management unit 122 (step S209), and the like are executed in accordance with description in a script file 502. It is to be noted that the script file 502 corresponds to a file in which the script of the PrintTicketToDevmode as illustrated in FIG. 6 is described.

Next, the print setting unit 130 requests the DEVMODE format setting processing unit 131 to generate print setting information in the DEVMODE format (step S210). The DEVMODE format setting processing unit 131 acquires each set value of the print setting information from the setting management unit 122 (step S211). The DEVMODE format setting processing unit 131 then generates print setting information in the DEVMODE format in which the acquired set values are set (step S212). Thereafter, for example, the generated print setting information in the DEVMODE format is returned to the application 101 through the OS 102.

Figure 10:
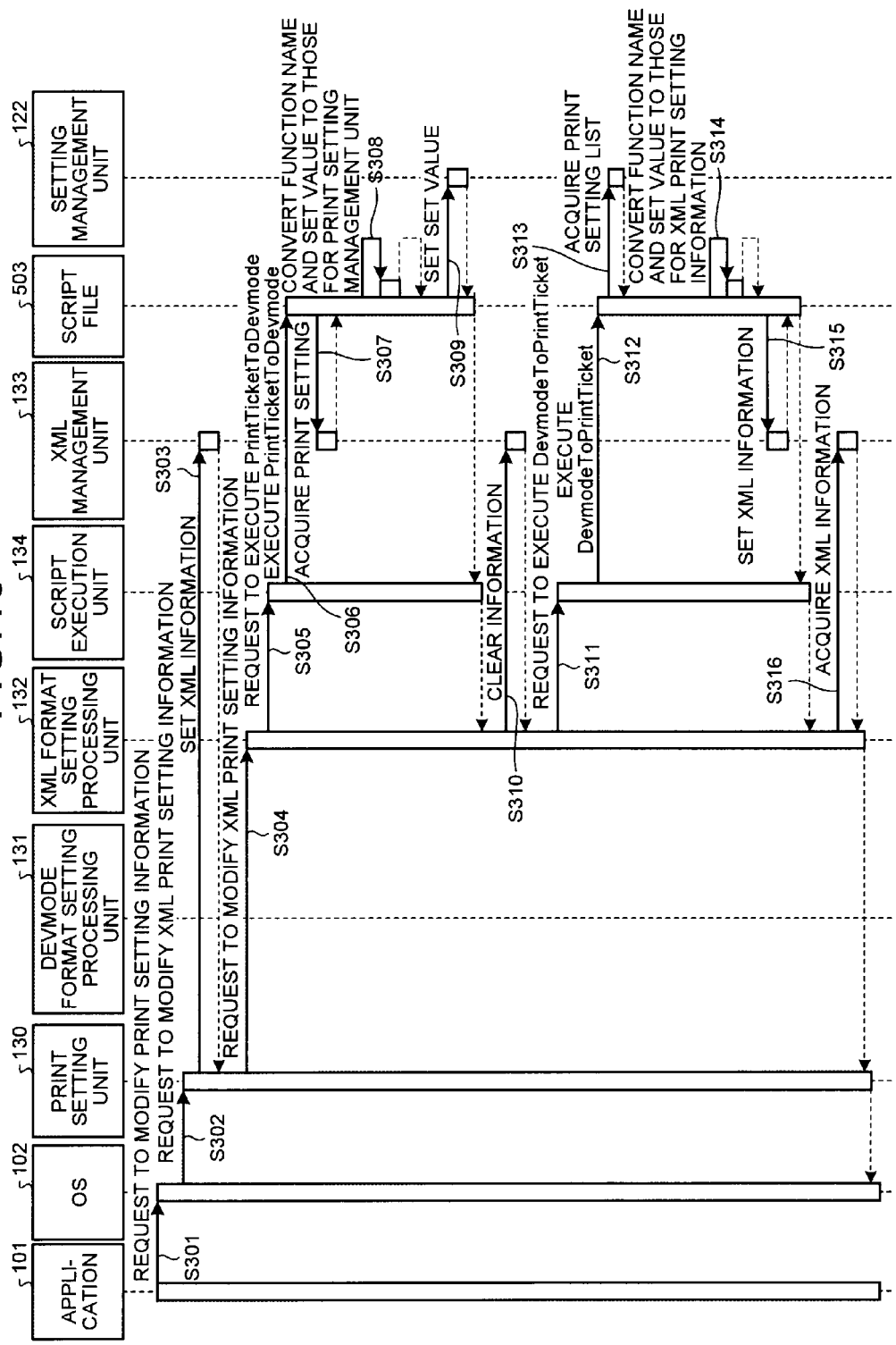
FIG. 10 is a sequence diagram illustrating an example of processing of modifying print setting information in the PrintTicket XML format.

FIG. 10 is a sequence diagram illustrating an example of processing of modifying print setting information in the PrintTicket XML format. In the processing, the script (FIG. 7) of the ValidatePrintTicket is executed.

At first, the application 101 requests the OS 102 to modify XML print setting information (step S301). The OS 102 requests the print setting unit 130 to modify the XML print setting information (step S302). The print setting unit 130 sets a set value of the XML print setting information that has been requested to be modified onto the XML management unit 133 (step S303). The print setting unit 130 then requests the XML format setting processing unit 132 to modify the XML print setting information (step S304).

Thereafter, the XML format setting processing unit 132 sequentially executes the PrintTicketToDevmode (step S305 through step S309), clear of the XML print setting information (step S310), and the DevmodeToPrintTicket (step S311 through step S315).

Since steps S305 to S309 are the same as steps S205 to S209 in FIG. 9, description thereof is not repeated. Furthermore, since steps S311 to S315 are the same as steps S106 to S110 in FIG. 8, description thereof is not repeated. It is to be noted that a script file 503 corresponds to a file in which the script of the ValidatePrintTicke as illustrated in FIG. 7 is described.

After step S310, the XML format setting processing unit 132 acquires the modified XML print setting information from the XML management unit 133 (step S316). Thereafter, for example, the acquired XML print setting information is returned to the application 101 through the OS 102.

Figure 11:
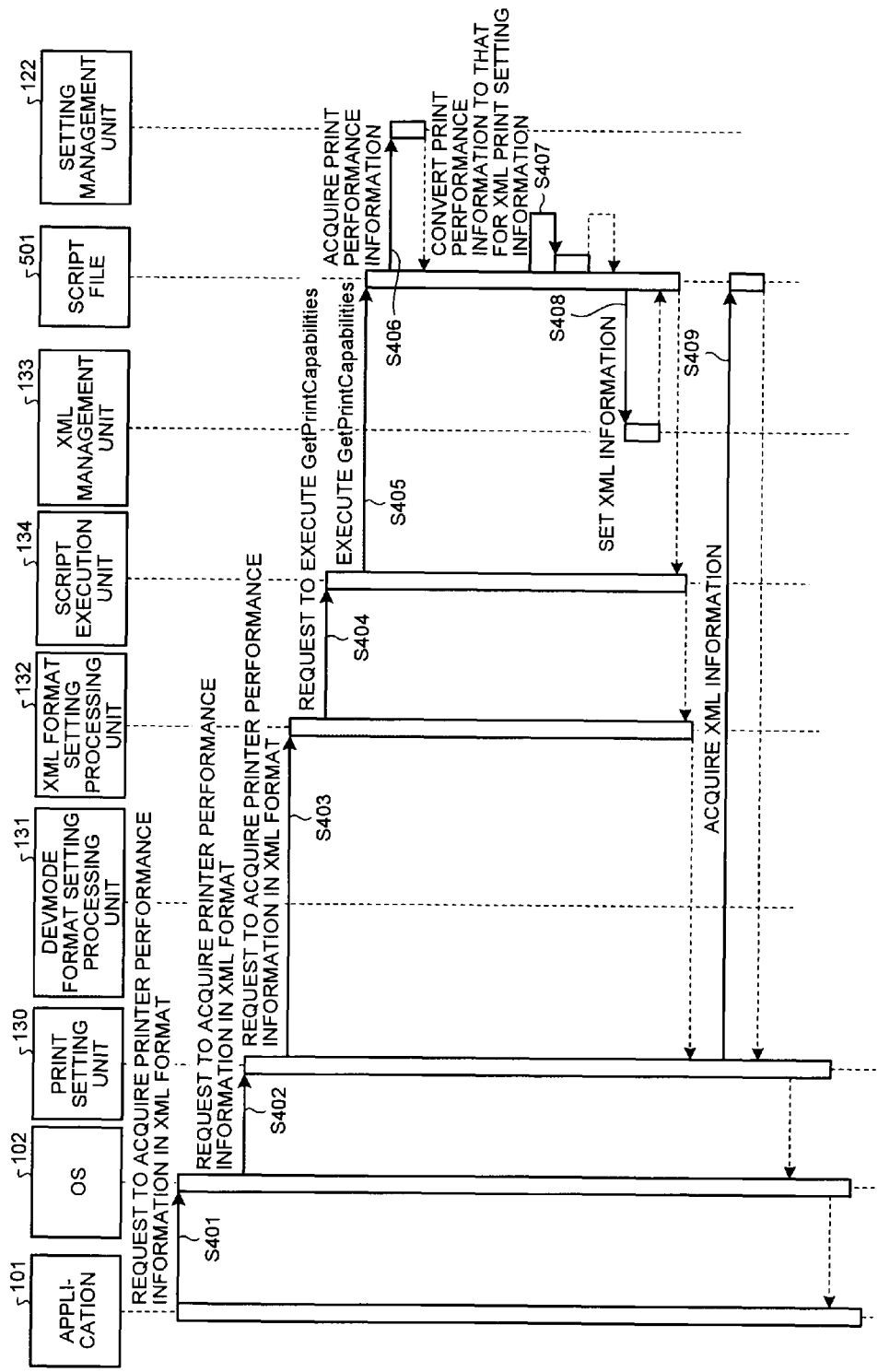
FIG. 11 is a sequence diagram illustrating an example of processing of acquiring performance information of a printer.

FIG. 11 is a sequence diagram illustrating an example of processing of acquiring performance information of the printer. In the processing, the script of the GetPrintCapabilities is executed.

At first, the application 101 requests the OS 102 to acquire printer performance information in the XML format (step S401). The OS 102 requests the print setting unit 130 to acquire the printer performance information in the XML format (step S402). The print setting unit 130 requests the XML format setting processing unit 132 to acquire the printer performance information in the XML format (step S403).

The XML format setting processing unit 132 requests the script execution unit 134 to execute the script of the GetPrintCapabilities (step S404).

The script execution unit 134 executes the script of the GetPrintCapabilities (step S405). In the script, processing of acquiring print performance information indicating set values that can be set onto the setting management unit 122 (step S406), processing of converting the print performance information to that for XML print setting information (step S407), processing of setting the print setting information onto the XML management unit 133 (step S408), and the like are executed in accordance with description in a script file 504. It is to be noted that the script file 504 corresponds to a file in which the script of the GetPrintCapabilities is described.

Next, the print setting unit 130 acquires the XML print setting information from the XML management unit 133 (step S409). Thereafter, for example, the acquired XML print setting information is returned to the application 101 through the OS 102.

Figure 12:
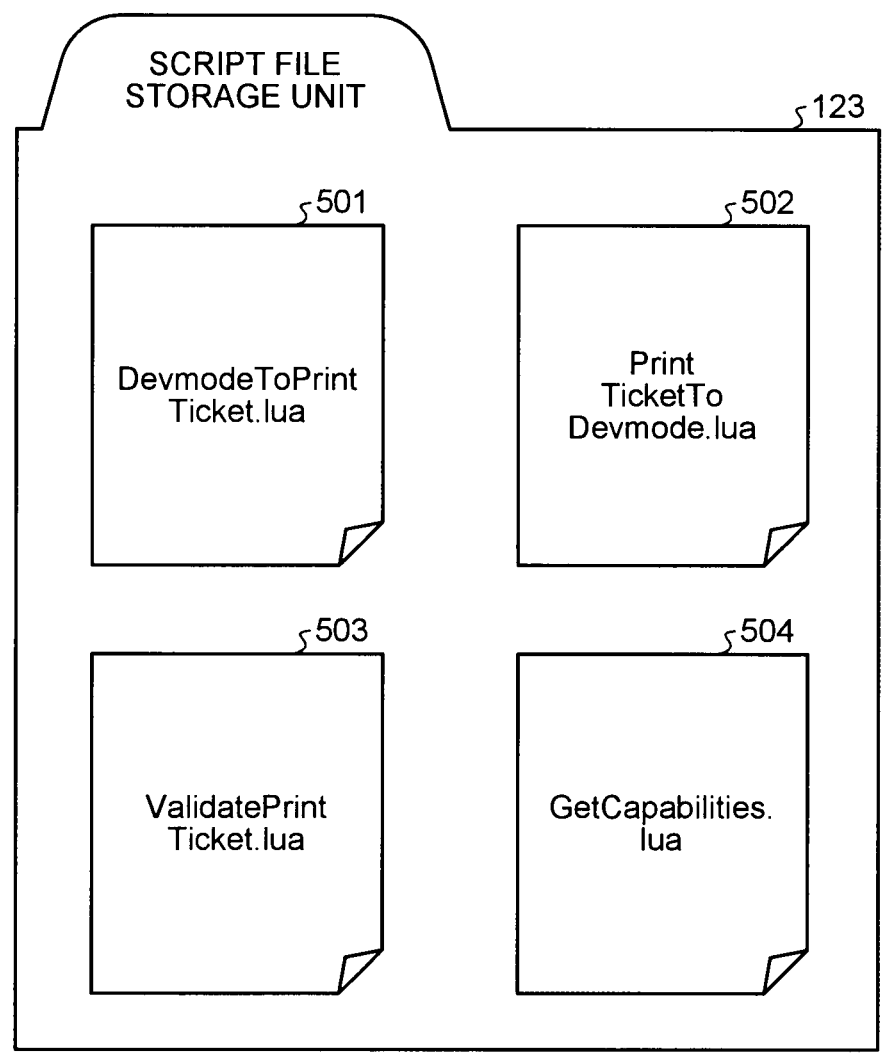
FIG. 12 is a view illustrating an example of a file storing form in a script file storage unit.

A storing form of a file in the script file storage unit 123 is described. FIG. 12 is a view illustrating an example of a storing form of a file in the script file storage unit 123. FIG. 12 illustrates an example of a form in which script files are stored separately for each of the functions as illustrated in FIG. 4. It is to be noted that the saving form is not limited to the example in FIG. 12, and all the functions (scripts) can be stored in one script file, for example. Furthermore, arbitrary combinations of the scripts each may be stored in one of a plurality of script files, for example.

Figure 13:
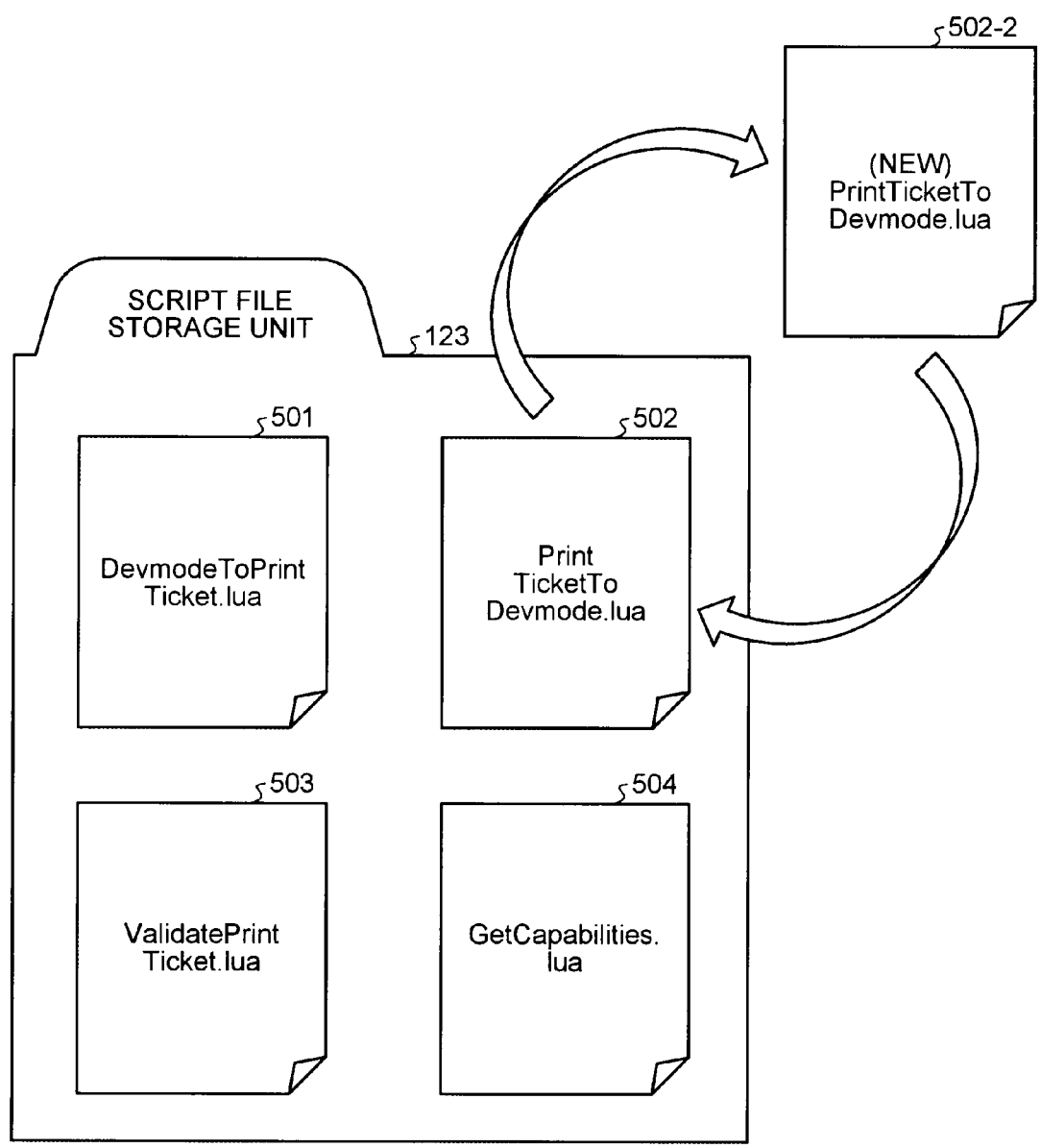
FIG. 13 is a view illustrating a file replacement operation when a function is added or changed.

FIG. 13 is a view illustrating a file replacement operation when a function is added or modified. FIG. 13 illustrates an example in which the script file 502 is replaced by a new script file 502-2 in which a function has been added or modified.

As described above, according to the embodiment, a function of operating the XML print setting information is formed by a script file. Therefore, even when a function is modified, it is sufficient that the script file is only changed and replaced, and a module is not required to be compiled. That is to say, even when a function of the printer is added or modified, the function added to or modified in the printer can be supported by the PrintTicket without need of changing a binary module requiring compilation.

Second Embodiment

In a second embodiment of the present invention, an example of a configuration of an information processing apparatus in which a function can be added with a plug-in is described.

Figure 14:
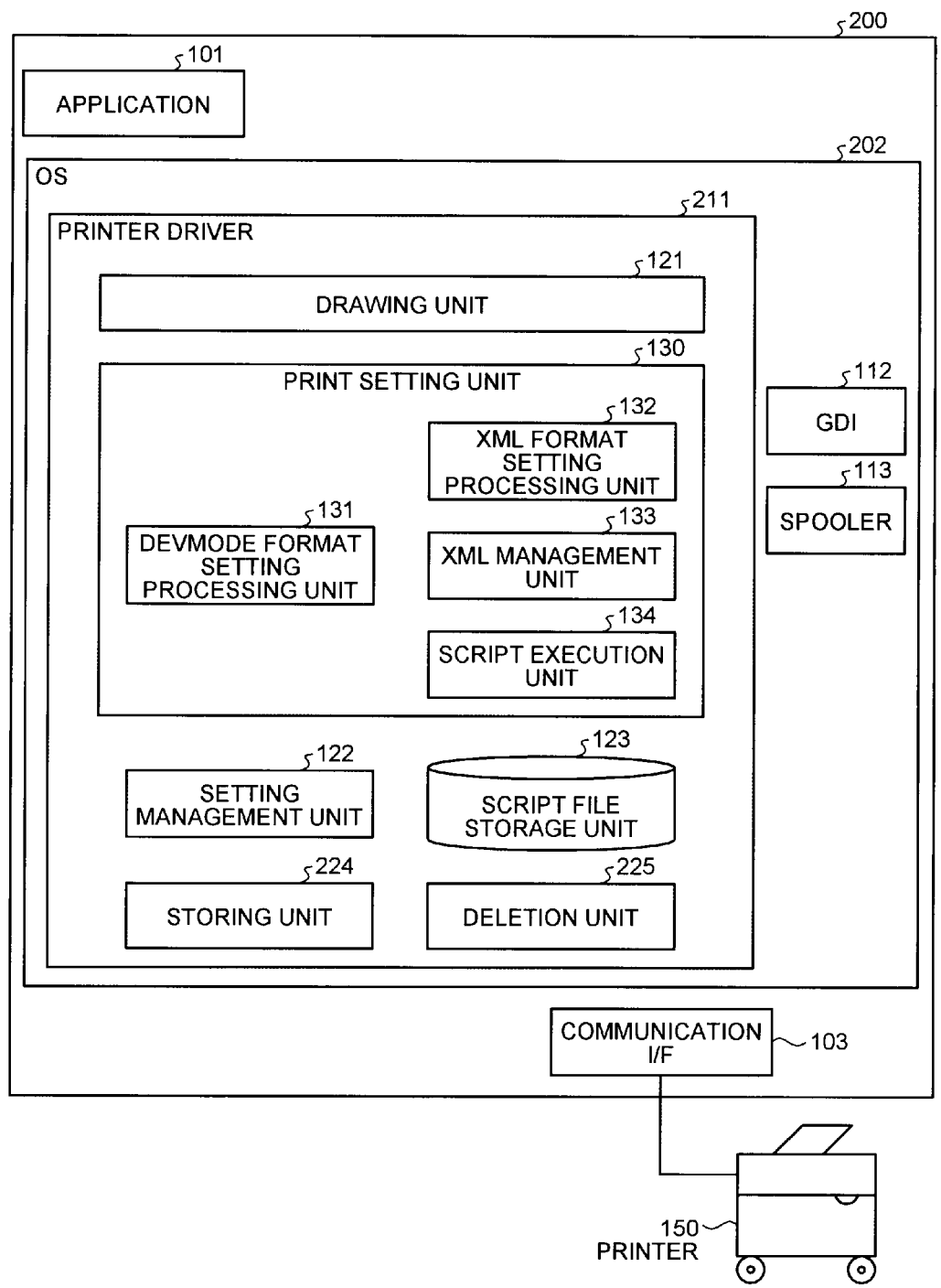
FIG. 14 is a block diagram illustrating an example of a configuration of an information processing apparatus according to a second embodiment of the present invention.

FIG. 14 is a block diagram illustrating an example of a configuration of an information processing apparatus 200 according to the second embodiment. As illustrated in FIG. 14, the information processing apparatus 200 includes the application 101, an OS 202, and the communication I/F 103.

The second embodiment is different from the first embodiment in a point that a storing unit 224 and a deletion unit 225 are added to a printer driver 211 of the OS 202. Other configurations and functions are the same as those as illustrated in FIG. 1 that is a block diagram illustrating the information processing apparatus 100 according to the first embodiment. Therefore, same reference numerals denote the same configurations and description thereof is not repeated.

When a plug-in is added, the storing unit 224 stores a script to convert a data format of print setting information (additional setting information) used in the plug-in in the script file storage unit 123. When a plug-in has been deleted, the deletion unit 225 deletes a script to convert a data format of print setting information used in the plug-in from the script file storage unit 123.

Figure 15:
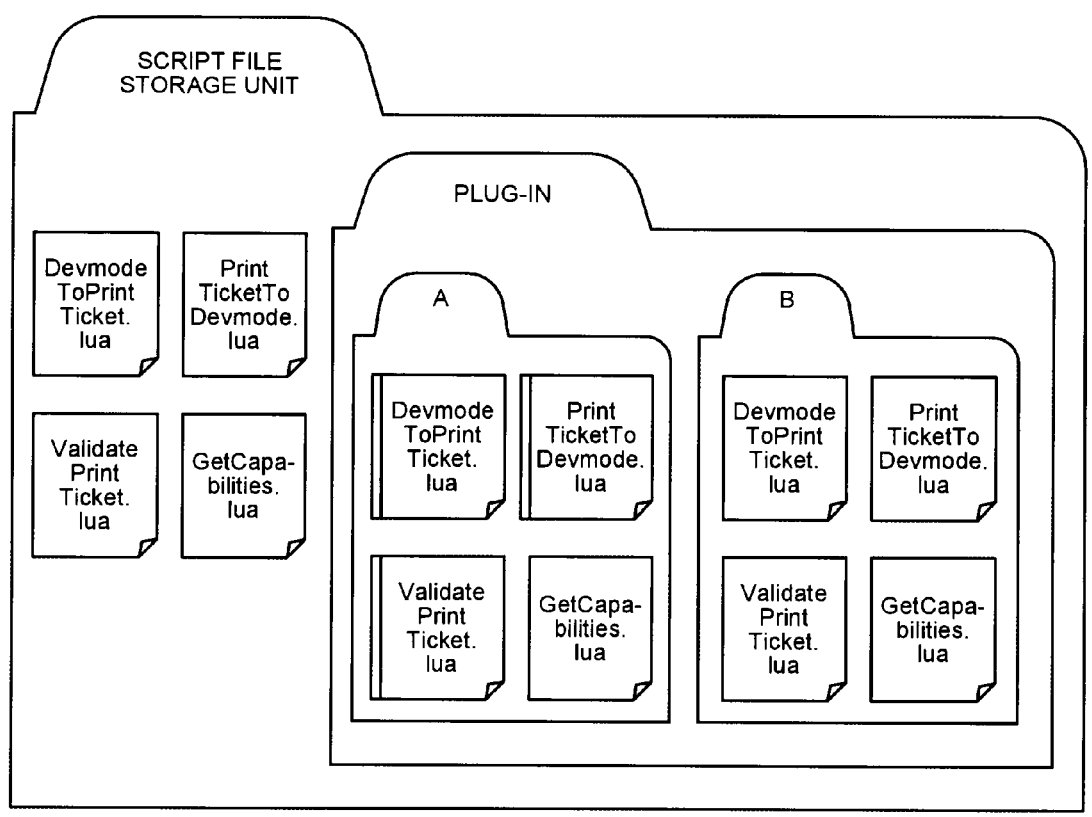

FIG. 15 is a view illustrating an example of a method of managing scripts when a function is added with a plug-in. FIG. 15 illustrates an example of a configuration of the script file storage unit 123 when two plug-ins including a plug-in A and a plug-in B are added after the printer driver 211 has been installed. As illustrated in FIG. 15, in the example, two folders including "A (for the plug-in A)" and "B (for the plug-in B)" are included in a folder "plug-in". A script to process each piece of XML print setting information is installed in one of two folders.

When a plug-in is uninstalled (deleted), the deletion unit 225 deletes files in a folder corresponding to the plug-in to be uninstalled, and the folder.

Figure 16:
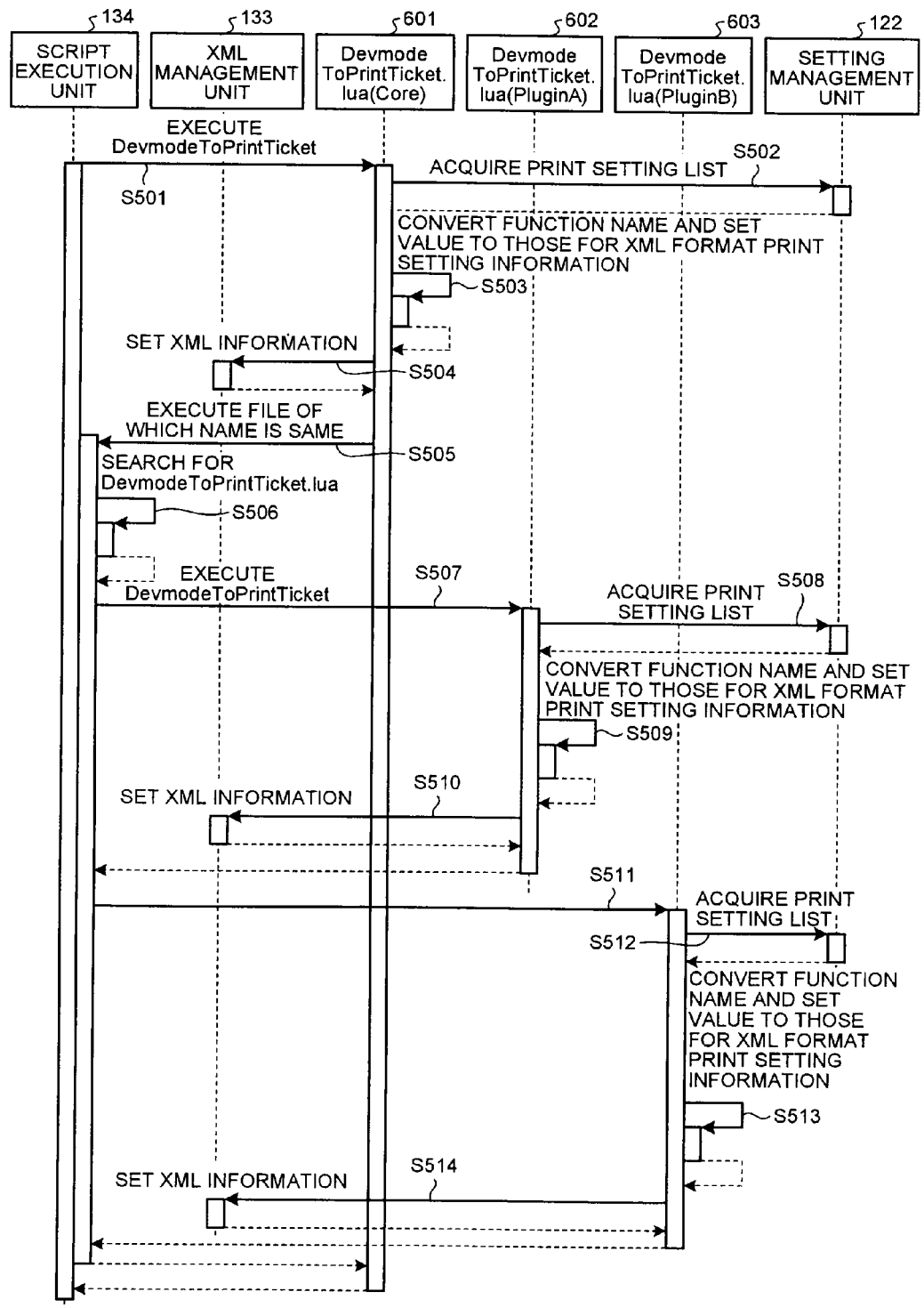
FIG. 16 is a sequence diagram illustrating an example of processing of DevmodeToPrintTicket when the plug-in has been installed.

Next, processing of a script when a plug-in is installed is described. FIG. 16 is a sequence diagram illustrating an example of processing of the DevmodeToPrintTicket when the plug-in A and the plug-in B are installed. It is to be noted that FIG. 16 illustrates a sequence of processing corresponding to steps S107 to S110 in FIG. 8. Since other processing is the same as that in FIG. 8, such processing is not illustrated.

Hereinafter, a script file that is installed on the script file storage unit 123 before a plug-in is added is referred to as a Core script file for convenience. In FIG. 16, a script file 601 corresponds to the Core script file. It is to be noted that in FIG. 16, script files 602 and 603 represent script files corresponding to the plug-ins A and B, respectively.

In steps S501 to S504, the same processing as in steps S107 to S110 in FIG. 8 is executed.

The Core script file 601 requests the script execution unit 134 to execute script files of which name is the same as the Core script file 601, that are installed in the script file storage unit 123, at a stage where processing in the Core script file 601 itself is ended (step S505).

The script execution unit 134 searches for the script files of which name is the same as the Core script file 601 ("DevmodeToPrintTicket.lua" in an example of FIG. 16) from the script file storage unit 123 in accordance with the request (step S506).

When the script files have been searched out, the script execution unit 134 sequentially executes the script files that have been searched out. In the example of FIG. 16, the script file 602 corresponding to the plug-in A (steps S507 to S510), and the script file 603 corresponding to the plug-in B (steps S511 to S514) are sequentially executed. Processing by each script file is the same as in steps S501 to S504.

Scripts other than the DevmodeToPrintTicket also cause a script corresponding to the added plug-ins to be executed in the same manner.

It is to be noted that a method of executing scripts corresponding to plug-ins is not limited to the above method. Any methods can be applied as long as they can, when a Core script file is executed, cause script files corresponding to plug-ins to be executed together with the Core script file. For example, the script files corresponding to the plug-ins may be executed first. Furthermore, it is not necessary that the names of the script files are the same. Any methods can be applied as long as they can cause correspondence between the script files to be judged, for example, by assigning corresponding numerical values, character strings, or the like to corresponding files.

As described above, in the second embodiment, even when a new function is added with the plug-in, a script file that operates XML print setting information corresponding to the function of the plug-in can be appropriately executed. That is to say, even when a function of the printer is added or modified, the function added to or modified in the printer can be supported by the PrintTicket without need of changing a binary module requiring compilation.

Figure 17:
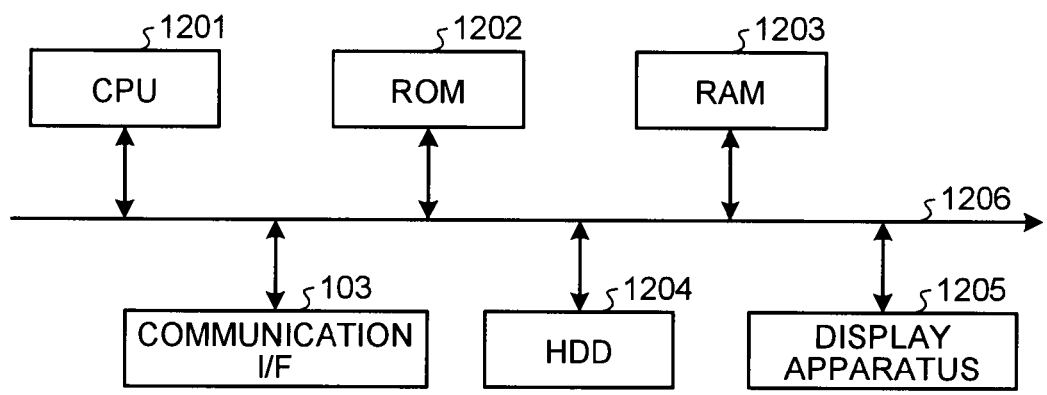
FIG. 17 is a view illustrating a hardware configuration of the information processing apparatus.

The information processing apparatuses according to the respective embodiments may have a normal hardware configuration utilizing a computer and include a CPU 1201, a Read Only Memory (ROM) 1202, a RAM 1203, the communication I/F 103, an HDD 1204 as an external storage device, a display apparatus 1205, and a bus 1206 that connects these components as illustrated in FIG. 17.

A computer program executed in the information processing apparatus according to each of the embodiments is recorded in a recording medium that can be read by a computer such as a CD-ROM, a flexible disk (FD), a CD-R, and a Digital Versatile Disk (DVD), as a file in a form that can be installed or executed, to be provided.

Furthermore, the computer program executed in the information processing apparatus according to each of the embodiments may be stored in a computer connected to a network such as the Internet and provided by being downloaded via the network. In addition, the computer program executed in the information processing apparatus according to each of the embodiments may be provided or distributed via a network such as the Internet.

Furthermore, the computer program executed in the information processing apparatus according to each of the embodiments may be provided by being previously incorporated in a ROM or the like.

The computer program executed in the information processing apparatus according to each of the embodiments has a module configuration including the above components (drawing unit, print setting unit, and setting management unit). As actual hardware, the CPU 1201 reads the computer program from the above storage medium so as to execute the computer program so that the above components are loaded on a main storage device (RAM 1203), and thus the above components are generated on the RAM 1203.

The present invention provides the effect of reducing an operation burden when a function of a printer is added, modified, or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a storage unit that stores therein:
a first script to convert a data format of print setting information from a first format to a second format, at least part of the print setting information in the first format being not capable of being changed through an application and the print setting information in the second format being capable of being changed through the application;
a second script to convert the data format of the print setting information from the second format to the first format; and
a third script to verify whether the print setting information in the second format that has been changed by the application can be set and modify the print setting information that cannot be set to the print setting information that can be set; and
a script execution unit that executes at least one of the first script, the second script, and the third script in accordance with a request from the application.

2. The information processing apparatus according to claim 1, further including:
a storing unit that, when a plug-in that executes a new function has been added, stores:
a fourth script to convert a data format of additional setting information representing print setting information of the plug-in from the first format to the second format; and
a fifth script to convert the data format of the additional setting information from the second format to the first format in the storage unit.

3. The information processing apparatus according to claim 2, further including:
a deletion unit that deletes the fourth script and the fifth script from the storage unit when the plug-in has been deleted.

4. The information processing apparatus according to claim 2, wherein
the script execution unit executes the fourth script together with execution of the first script and executes the fifth script together with execution of the second script when the plug-in is added.

5. The information processing apparatus according to claim 1, wherein
the storage unit further stores therein:
a fourth script to acquire a set value that can be set in the print setting information by the application, and
the script execution unit further executes the fourth script in accordance with another request from the application.

6. The information processing apparatus according to claim 1, wherein
the first format is a DEVMODE format and the second format is a PrintTicket format.

7. A computer program product comprising a non-transitory computer-usable medium having computer-readable program codes embodied in the medium, wherein
the program codes comprises codes configured as:
a first script to convert a data format of print setting information from a first format to a second format, at least part of the print setting information in the first format being not capable of being changed through an application and the print setting information in the second format being capable of being changed through the application;
a second script to convert the data format of the print setting information from the second format to the first format, and
a third script to verify whether the print setting information in the second format that has been changed by the application can be set and modify the print setting information that cannot be set to the print setting information that can be set, and
the program codes when executed causing a computer to function as:
a script execution unit that executes at least one of the first script, the second script, and the third script in accordance with a request from the application.

8. The computer program product according to claim 7, wherein
the program codes when executed causing the computer to further function as:
a storing unit that, when a plug-in for executing a new function has been added, stores a fourth script to convert a data format of additional setting information representing print setting information of the plug-in from the first format to the second format and a fifth script to convert the data format of the additional setting information from the second format to the first format.

9. The computer program product according to claim 8, wherein
the program codes when executed causing the computer to further function as:
a deletion unit that deletes the fourth script and the fifth script when the plug-in has been deleted.

10. The computer program product according to claim 8, wherein
the script execution unit executes the fourth script together with execution of the first script and executes the fifth script together with execution of the second script when the plug-in has been added.

11. The computer program product according to claim 7, wherein
the program codes further comprises codes configured as:
a fourth script to acquire a set value that can be set in the print setting information by the application, and
the script execution unit further executes the fourth script in accordance with another request from the application.

12. The computer program product according to claim 7, wherein
the first format is a DEVMODE format and the second format is a PrintTicket format.

13. A non-transitory computer-readable storage medium storing computer-readable program codes which when executed by a computer cause the computer to perform a method of processing print setting information, the method comprising:
executing, by the computer and in accordance with a request from an application, a first script that is configured to convert a data format of the print setting information from a first format to a second format, at least part of the print setting information in the first format being not capable of being changed through an application and the print setting information in the second format being capable of being changed through the application,
executing, in accordance with the request from the application, a second script that is configured to convert the data format of the print setting information from the second format to the first format, and executing, by the computer and in accordance with the request from the application, a third script that is configured to verify whether the print setting information in the second format that has been changed by the application can be set and modify the print setting information that cannot be set to the print setting information that can be set.

14. The non-transitory computer-readable storage medium according to claim 13, wherein the method further comprises:

storing in a storing unit, when a plug-in for executing a new function has been added, a fourth script to convert a data format of additional setting information representing print setting information of the plug-in from the first format to the second format and a fifth script to convert the data format of the additional setting information from the second format to the first format.

15. The non-transitory computer-readable storage medium according to claim 14, wherein the method further comprises: deleting the fourth script and the fifth script when the plug-in has been deleted.

16. The non-transitory computer-readable storage medium according to claim 14, wherein the method further comprises:

executing the fourth script together with execution of the first script and executing the fifth script together with execution of the second script when the plug-in has been added.

17. The non-transitory computer-readable storage medium according to claim 13, wherein the method further comprises:

executing a fourth script, in accordance with another request from the application, that is configured to acquire a set value that can be set in the print setting information by the application.

18. The non-transitory computer-readable storage medium according to claim 13, wherein the first format is a DEVMODE format and the second format is a PrintTicket format.

* * * * *